United States Patent
Wilmes et al.

[11] Patent Number: 5,981,653
[45] Date of Patent: Nov. 9, 1999

[54] PROCESS FOR THE PRODUCTION OF AQUEOUS STOVING COATING COMPOSITIONS

[75] Inventors: Oswald Wilmes, Köln; Lothar Kahl; Bernd Klinksiek, both of Bergisch Gladbach; Christian Wamprecht, Neuss; Manfred Bock, Leverkusen; Klaus Nachtkamp, Düsseldorf, all of Germany

[73] Assignee: Bayer Aktiengesellschaft, Leverkusen, Germany

[21] Appl. No.: 08/844,815

[22] Filed: Apr. 22, 1997

[30] Foreign Application Priority Data

Apr. 29, 1996 [DE] Germany .................. 196 17 086

[51] Int. Cl.$^6$ .................. C08J 3/03; C08L 75/04; C08G 18/40; C08G 18/80
[52] U.S. Cl. .................. 524/839; 528/45; 528/71; 528/73; 528/502 E; 528/502 F; 524/591; 524/840; 523/220; 523/315
[58] Field of Search .................. 524/591, 839, 524/840; 528/45, 71, 73, 502 E, 502 F; 523/220, 315

[56] References Cited

U.S. PATENT DOCUMENTS

| | | |
|---|---|---|
| 4,321,173 | 3/1982 | Schuhmacher et al. .................. 525/453 |
| 4,543,144 | 9/1985 | Thoma et al. .................. 156/230 |
| 4,608,413 | 8/1986 | Nachtkamp et al. .................. 524/591 |
| 4,996,004 | 2/1991 | Bücheler et al. .................. 252/314 |
| 5,116,536 | 5/1992 | Bücheler et al. .................. 252/314 |
| 5,126,393 | 6/1992 | Blum et al. .................. 524/538 |
| 5,342,882 | 8/1994 | Göbel et al. .................. 524/832 |
| 5,379,947 | 1/1995 | Williams et al. .................. 241/21 |
| 5,455,297 | 10/1995 | Pedain et al. .................. 524/591 |
| 5,498,783 | 3/1996 | Foukes et al. .................. 525/165 |
| 5,536,785 | 7/1996 | Foukes et al. .................. 525/176 |
| 5,596,043 | 1/1997 | Harris et al. .................. 525/127 |
| 5,723,518 | 3/1998 | Kahl et al. .................. 523/324 |

FOREIGN PATENT DOCUMENTS

| | | |
|---|---|---|
| 2150525 | 12/1995 | Canada . |
| 524511 | 1/1993 | European Pat. Off. . |
| 2829648 | 1/1980 | Germany . |

OTHER PUBLICATIONS

James W. Rosthauser and Klaus Nachtkamp in Advances in Urethane Science and Technology, K.C. Frisch and D. Klempner editors, vol. 10, pp. 121–162 1987.

*Primary Examiner*—Rabon Sergent
*Attorney, Agent, or Firm*—Joseph C. Gil; Thomas W. Roy

[57] ABSTRACT

The present invention relates to a process for the production of aqueous dispersions which form powder coatings at room temperature, have an average particle size of 0.1 to 10 μm, contain polyols and blocked polyisocyanate crosslinking agents, and, after stoving, yield coatings with improved water and solvent resistance, in particular on metallic substrates.

10 Claims, 3 Drawing Sheets homogenisation of the oil-in-water emulsion oil-in-water pre-emulsion

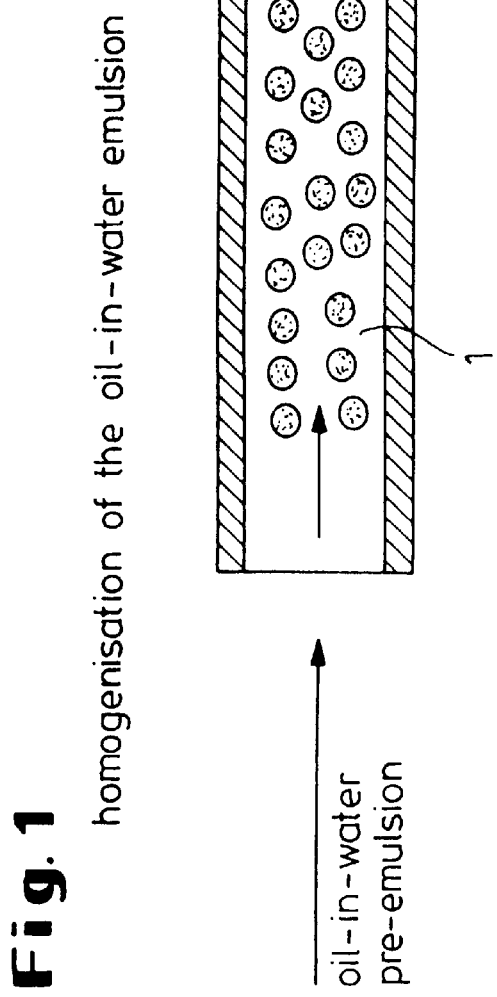
Fig. 1 homogenisation of the oil-in-water emulsion

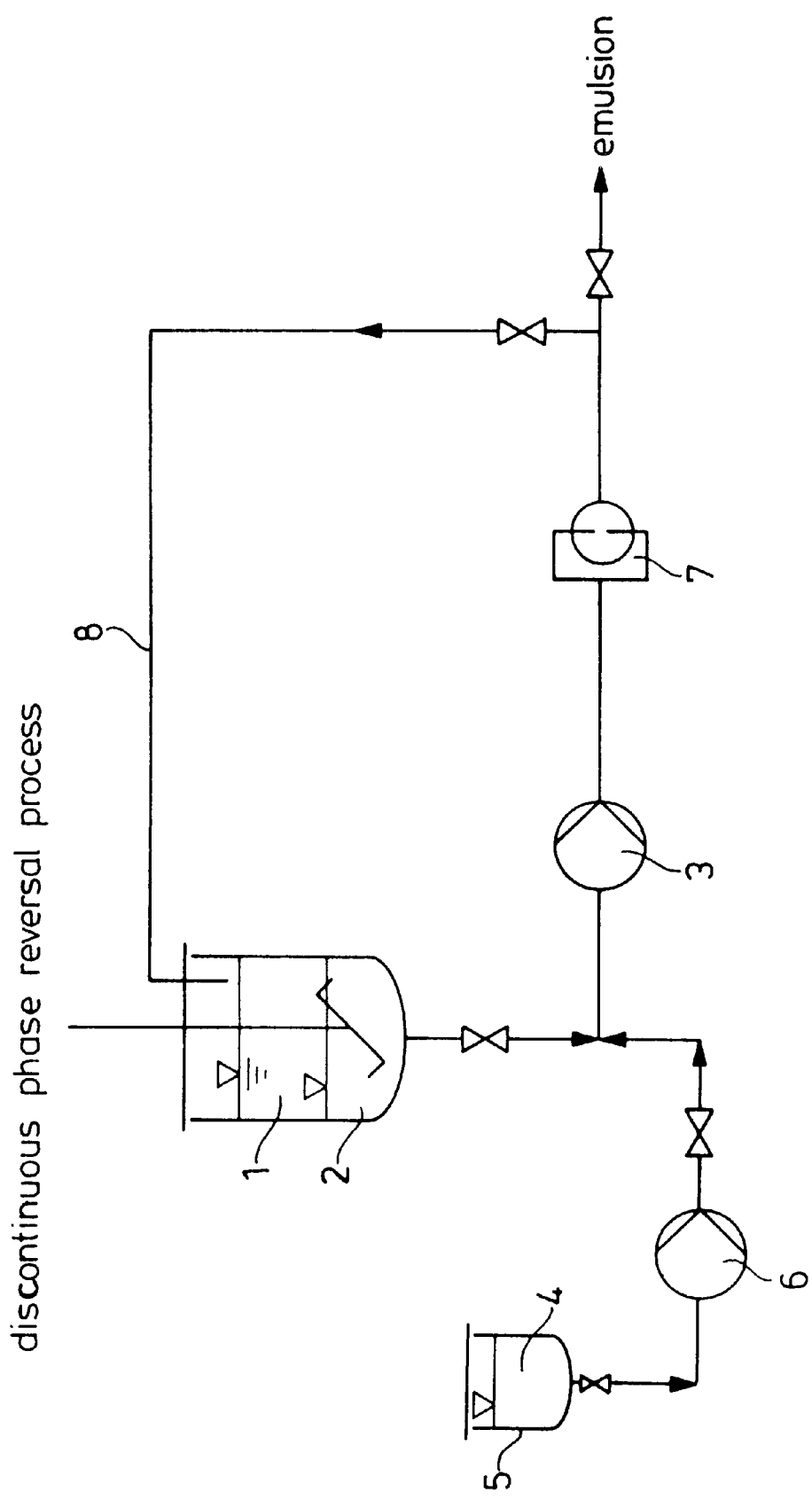
Fig. 2 discontinuous phase reversal process

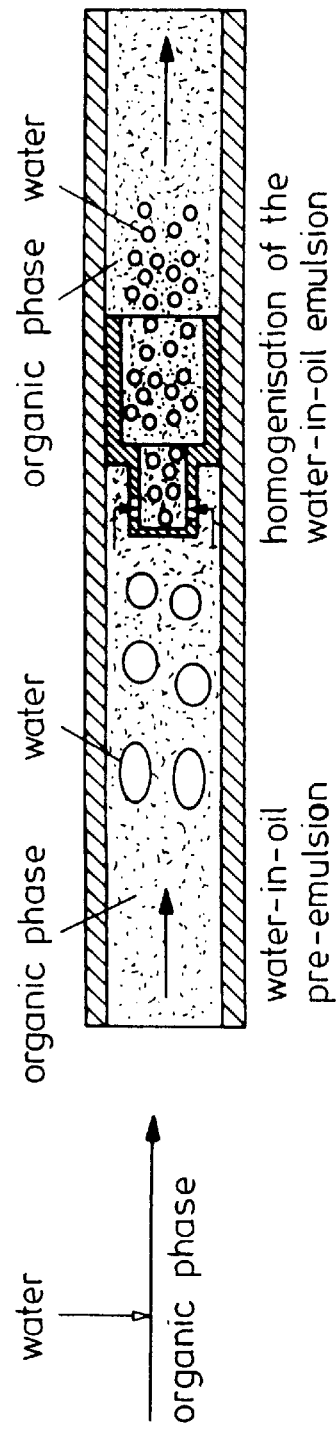
Fig. 3 production of the water-in-oil pre-emulsion
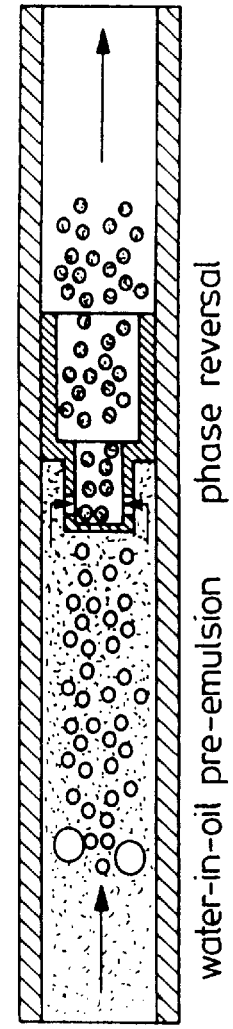
Fig. 4 phase reversal to form the oil-in-water emulsion, while retaining the phase boundary

PROCESS FOR THE PRODUCTION OF AQUEOUS STOVING COATING COMPOSITIONS

BACKGROUND OF THE INVENTION

1. Field of the Invention

The present invention relates to a process for the production of aqueous dispersions containing polyols and blocked polyisocyanate crosslinking agents, which dry as a powder on the surface to be coated and, after stoving, yield coatings with improved water and solvent resistance.

2. Description of the Prior Art

Aqueous polyurethane dispersions are known (c.f. Houben-Weyl, *Methoden der organ. Chemie,* 4th edition, volume E 20, page 1659 (1987)). However, where higher quality is demanded, for example, in automotive lacquer coatings, non-reactive polyurethanes exhibit various weaknesses. The essential reason is the lack of crosslinking between the film-forming macromolecules, which results in diminished water and solvent resistance and poor mechanical properties. More recent post-crosslinking coating systems, such as those obtained by combining isocyanate-reactive resins with blocked polyisocyanate crosslinking agents (c.f. J. W. Rosthauser, K. Nachtkamp in *Advances in Urethane Science and Technology*, K. C. Frisch and D. Klempner, editors, volume 10, pages 121–162 (1987)), provide better properties.

The resins used are polyurethane, polyepoxy, polyester or polyacrylate resins or dispersions which are crosslinkable via hydroxyl groups. The crosslinking agents are blocked polyisocyanates, which have optionally been hydrophilically modified. Such systems are known, for example, from DE-OS 4,213,527, EP-A 581,211, EP-A 427,028, U.S. Pat. No. 4,543,144, DE-OS 3,345,448 and DE-OS 2,829,648.

Systems which may be considered for lacquer and coating applications have the characteristic of exhibiting good film-forming properties even at room temperature. If this characteristic is not present, films having overall poorer properties are obtained, e.g., poorer levelling and lower gloss. Film formation is sometimes improved by the addition of solvents.

The application of powder coatings from the aqueous phase is described, for example, in EP-A 652,264. A disadvantage is that, during production, extrusion of the binder is followed by a grinding operation, which is very elaborate and associated with high costs. Moreover, there are limits to powder fineness in a grinding operation.

It has now been found that it is possible to economically obtain valuable, solvent-free, heat curing lacquer dispersions which dry as a powder by combining certain isocyanate-reactive resins with blocked polyisocyanate crosslinking agents. The resulting products are valuable coating compositions, which may be applied as a one-component system to provide coatings having particularly high quality surface properties. It should be emphasized that highly level, high gloss coatings having very good water and solvent resistance are obtained.

A further advantage is that even though the binders dry as a powder, coatings produced according to the invention may be applied using existing liquid lacquer equipment. Thinner coats are obtained than with conventional powder coating, and cleaning operations are simplified in comparison with conventional powder coating since the equipment and booths may be spray cleaned. Cleaning operations are also simplified in comparison with solvent-based lacquer coating because neither film formation nor, in comparison with two-component lacquers, crosslinking occurs at room temperature.

Known conventional aqueous coating compositions, which form coatings at temperatures as low as room temperature, often have only a narrow application window (range of temperature and relative atmospheric humidity during application) and have a distinct tendency to blister (pinholing). Eliminating these difficulties is distinctly more favorable with binders which dry as a powder. Surface properties are less dependent upon climatic conditions (temperature, relative atmospheric humidity) during application. Greater film thicknesses may also be achieved without pinholing due to evaporation of the water.

SUMMARY OF THE INVENTION

The present invention relates to a process for the production of aqueous dispersions which form powder coatings at room temperature, have an average particle size of 0.1 to 10 $\mu$m, preferably 0.1 to 5 $\mu$m, more preferably 0.1 to 3 $\mu$m, and most preferably 0.1 to 0.6 $\mu$m, and form a film and crosslink under the action of heat, in which the dispersions are prepared by mixing A) a polyol component which has a glass transition temperature $T_g$ of >30° C. and may optionally be hydrophilically modified, B) a (cyclo)aliphatic polyisocyanate component which contains isocyanurate groups and blocked isocyanate groups and may optionally be hydrophilically modified and C) optionally external emulsifiers, and passing the mixture through a dispersion device containing flash homogenizing nozzles.

The present invention also relates to the resulting aqueous dispersions and their use for preparing coatings at elevated temperatures that have improved water and solvent resistance.

BRIEF DESCRIPTION OF THE DRAWINGS

FIG. 1 shows a continuous phase reversal embodiment of the present invention.

FIGS. 2, 3 and 4 show a discontinuous phase reversal embodiment of the present invention.

DETAILED DESCRIPTION OF THE INVENTION

Dispersion devices having increased dispersion power per unit volume, such as flash homogenizing nozzles, are used for producing the dispersions which dry as powder. These dispersion devices are known and described, for example, in *Formation of Emulsions* in P. Beche, Encyclopedia of Emulsion Technology, volume 1, New York, Basel, Decker, 1983. However, they have not previously been used for the production of aqueous dispersions which dry as a powder.

Dispersion devices are selected on the basis of power per unit volume. Dispersion devices having an elevated power per unit volume, for example, high pressure homogenizers, are required for the production of finely divided dispersions (particle diameter approximately 1 $\mu$m). Such finely divided emulsions cannot be made with rotor/stator devices. The jet disperser described in EP-A 0,101,007 (U.S. Pat. No. 4,996,004, herein incorporated by reference) is a special flash nozzle, which is substantially more efficient than high pressure homogenizers. At a homogenizing pressure of as low as 50 bar particle sizes are achieved with the jet disperser, which can only be attained with pressures of 200 bar in a high pressure homogenizer. The nozzles of the jet disperser have a hydraulic diameter of 0.1–0.8 mm and are of such dimensions that energy densities of $10^5$–$10^8$ joule/m$^3$ are formed in the dispersion step.

Particularly finely divided dispersions may be produced both continuously and discontinuously when using the jet disperser as the dispersion device.

According to the invention, the aqueous dispersion may also be converted from a water-in-oil to an oil-in-water emulsion by phase reversal.

Two types of processes may be mentioned by way of example:

a) continuous direct dispersion (cf. FIG. 1):

By injecting the organic phase into water an oil-in-water pre-emulsion 1 is formed which is then homogenised in flash nozzle 2.

b) discontinuous phase reversal process (cf. FIG. 2):

The polymer solution 1 is initially introduced into the loop container 2 and passed along loop 8 by means of booster pump 3 and the jet disperser 7. At the same time the water or the emulsifier solution 4 is introduced from container 5 into the loop stream at a predetermined mixing ratio by means of pump 6 and homogenised in a finely divided form.

A finely divided water-in-oil emulsion (cf. FIG. 3) is initially formed which then inverts into the oil-in-water emulsion (cf. FIG. 1) at a specific concentration of water in the oil phase, while retaining the phase boundary. As soon as the phase reversal is complete the production of the emulsion can be terminated or it can be diluted further with water to produce the required concentration for the formulation concerned.

The aqueous powder coating composition produced according to the invention may be used for producing stoving coatings on any desired, heat-resistant substrates, such as unpigmented clear coatings or pigmented coatings for the production of single and multi-layer coatings, for example, for automotive applications.

Binder component A) is selected from water-soluble or water-dispersible polyhydroxyl compounds known from polyurethane lacquer chemistry, provided that the polyhydroxyl compounds have a sufficient content of hydrophilic groups to ensure their solubility or dispersibility in water. Preferred hydrophilic groups are carboxylate groups and/or polyether chains containing ethylene oxide units. It is also possible to use polyhydroxyl compounds which are not hydrophilic or are not sufficiently hydrophilic to be water dispersible, provided that they are blended with external emulsifiers. It is also possible to combine a polyol (A) which is not hydrophilic or not sufficiently hydrophilic to be water dispersible with a hydrophilically modified crosslinking agent B) and optionally an external emulsifier.

Examples of compounds which may be used as component A) are polyhydroxypolyesters, polyhydroxypolycarbonates, polyhydroxyurethanes, polyhydroxypolyacrylates, or mixtures thereof. In addition to mixtures of polyhydroxy compounds, it is also possible to use polyhydroxy compounds which contain urethane, polyacrylate, polyester and/or polycarbonate groups.

Polyhydroxyl compounds A) have an OH number of 30 to 200, preferably of 40 to 150 mg of KOH/g; a weight average molecular weight (determined by gel permeation chromatography (GPC) using polystyrene as the standard) of 500 to 100,000, preferably 1000 to 50,000, and more preferably 2000 to 25000; and a glass transition temperature $T_g$, which may be determined by differential thermal analysis (DTA), of 30 to 100° C.

Examples of suitable polyesterpolyols include the reaction products of polyhydric alcohols with the polycarboxylic acids or polycarboxylic anhydrides known from polyurethane chemistry, in particular dicarboxylic acids or dicarboxylic anhydrides.

These polyester may be hydrophilically modified by known methods, such as those described in EP-A-0,157,291 and EP-A-0,427,028. The polymers which contain hydroxyl groups, are soluble or dispersible in water, and are described in DE-OS 3,829,587 are also suitable as component A) according to the invention.

Suitable polycarbonatepolyols are those known from polyurethane chemistry and may be obtained by reacting the diols with diaryl carbonates or phosgene.

Suitable polyhydroxypolyacrylates are the known copolymers of simple acrylic acid esters, optionally styrene and, to introduce hydroxyl groups, hydroxyalkyl esters, such as 2-hydroxyethyl, 2-hydroxypropyl, 2-, 3- or 4-hydroxybutyl esters of these acids. The polyhydroxypolyacrylates may be hydrophilically modified during production by copolymerization with olefinically unsaturated carboxylic acids such as acrylic acid. Once the reaction is complete, the incorporated carboxyl groups are at least partially neutralized with a suitable neutralizing agent. Suitable neutralizing agents include alkali metal or alkaline earth metal hydroxides, but are preferably tertiary amines such as triethylamine, triethanolamine or N,N-dimethyl-ethanolamine. In general, at least 50% of the carboxyl groups present are neutralized; an excess of neutralizing agent may also be used. Component A) preferably has a carboxyl group content of 0.1 to 120, preferably of 1 to 80 milliequivalents per 100 g of solids.

Polyol component A) may be produced as a solid resin or in solution. When produced in solution, the solvents should be those which may subsequently be removed by distillation.

Component B) is selected from blocked (cyclo)aliphatic polyisocyanates containing biuret and/or isocyanurate groups, which may optionally also contain allophanate groups. Known (cyclo)aliphatic diisocyanates may be used to produce the polyisocyanate component. 1,6-diisocyanatohexane (HDI), 1-isocyanato-3,3,5-trimethyl-5-isocyanatomethylcyclohexane (IPDI), 2,4- and/or 2,6-diisoyanato-1-methylcyclohexane (hydrogenated tolylene diisocyanate) and 4,4'-diisocyanatodicyclohexylmethane (HMDI) are preferably used.

Polyisocyanate component B) is produced by blocking the previously described polyisocyanates, which may optionally be hydrophilically modified, with blocking agents in known manner.

The blocking agents are known reversible, monofunctional blocking agents, such as ε-caprolactam, diethyl malonate, ethyl acetoacetate, oximes such as butanone oxime, 1,2,4-triazole, dimethyl-1,2,4-triazole, 3,5-dimethylpyrazole, imidazole and mixtures thereof. Preferred blocking agents are those which dissociate at a temperature below 160° C., in particular butanone oxime or 3,5-dimethylpyrazole.

The polyisocyanate component may be hydrophilically modified by known methods, i.e., by reacting a proportion of the NCO groups with hydroxycarboxylic acids, such as 2,2-dimethylolpropionic acid of 3-hydroxy-2,2-dimethylpropanoic acid (hydroxypivalic acid), and/or with monofunctional polyethers having an ethylene oxide content of at least 80 wt. %.

Crosslinking component B) is produced by reacting the polyisocyanate in succession in any desired sequence or simultaneously with the blocking agent, the hydroxycarboxylic acid and/or the polyethers. Preferably, the hydroxycarboxylic acid and/or the polyether are reacted first and then the blocking agent. A slight excess of blocking agent may be used. However, processing may also be continued if small proportions of unreacted NCO groups are still present in the reaction mixture. The reactions proceed at 0° C. to 120° C., preferably at 20 to 120° C. The hydroxycarboxylic acid is preferably reacted under mild conditions to prevent the carboxyl group from also reacting with the NCO groups.

The reactions may be conducted without solvent or in an inert solvent, which may optionally be removed by distillation after the reaction, neutralization and dispersion in water. The solvents are preferably not reactive towards NCO groups. Suitable solvents include ketones such as acetone and methyl ethyl ketone; esters such as ethyl acetate; N-methylpyrrolidone; and ethylene glycol monobutyl ether acetate. Small quantities of solvents may, under certain circumstances, also remain in the coating composition as stabilizers or levelling agents.

Once the reaction is complete, the incorporated carboxyl groups are optionally at least partially neutralized with a suitable neutralizing agent. Suitable neutralizing agents include alkali metal or alkaline earth metal hydroxides, but are preferably tertiary amines such as triethylamine, triethanolamine or more preferably N-dimethylethanolamine. In general, at least 50% of the carboxyl groups present are neutralized. An excess of neutralizing agent may also be used.

The coating compositions according to the invention are produced by dissolving components A) and B) in solvents, preferably those which may be removed from the aqueous dispersion by vacuum distillation and are not reactive towards NCO groups. Suitable solvents include those previously set forth. Acetone and methyl ethyl ketone being preferred. It is also possible to produce components A) and B) in separate solutions and then to mix these solutions.

An external emulsifier C) may optionally be added to the solution of A) and B), which already contains the neutralizing agent, before the solution is mixed with water. The quantity of water is preferably selected such that 20 to 60 wt. % aqueous dispersions of the coating compositions according to the invention are produced. Once addition of the water is complete, the solvent is preferably removed by vacuum distillation.

It is also possible to add the neutralizing agent to the dispersing water. In this embodiment the aqueous solutions or dispersions are prepared by adding a mixture of components A) and B) containing free carboxyl groups and blocked isocyanate groups, optionally in the form of an organic solution, to an aqueous solution of a neutralizing agent such that neutralization take place at same time as the dissolution or dispersion of components A) and B).

The mixing ratio of polyhydroxyl component A) to blocked polyisocyanate B) is selected such that the equivalent ratio of blocked isocyanate groups to hydroxyl groups is 0.5:1 to 2:1, preferably 0.7:1 to 1.5:1.

Known additives such as pigments, dispersion aids, levelling agents, anti-blistering agents and catalysts may be added either to the aqueous binder mixture, to individual components A) or B) before they are combined or to the mixture of components A) and B) before dispersion.

The coating compositions according to the invention may be applied in single or multiple layers onto any desired heat resistant substrates using known methods, for example, by spraying, brushing, dipping, flow coating or using rollers and doctor knives.

Coatings are obtained, for example, on metal, plastics, wood or glass by curing the lacquer films at 80 to 220° C., preferably 110 to 180° C. and more preferably 110 to 160° C.

The binders according to the invention are preferably suitable for the production of coatings and on sheet steel used, for example, in the production of automotive bodywork, machinery, cladding, drums or containers. The coatings generally have a dry film thickness of 0.01 to 0.3 mm.

An advantage of the compositions according to the invention when compared to solvent systems is the distinctly lower solvent content. In comparison with conventional water-based costing compositions, the distinctly lower content of organic co-solvents and the greater reliability of application due to the wider range of application conditions are advantageous. Another advantage is the distinctly lower tendency towards pinholing and better sag resistance.

In comparison with conventional powder coatings, the coatings according to the invention possess better levelling at low film thicknesses. In addition, application using existing one-component liquid lacquer equipment is possible, equipment cleaning is simpler and no problems are caused on the coating line by stray fine powders.

The invention is further illustrated but is not intended to be limited by the following examples in which all parts and percentages are by weight unless otherwise specified.

EXAMPLES

1. General Procedure for the Production of a Polyhydroxyl-Polyester-Polyacrylate Polyol Component A Part I was initially introduced into a 5 liter stainless steel pressure reactor equipped with stirring, cooling and heating devices and electronic temperature control and heated to the reaction temperature. Part II (added over a period of 2.5 hours) and part III (added over a period of 3 hours) were then metered, starting simultaneously, into the sealed reactor at a constant temperature. Once part III had been added, the mixture was stirred for an additional 1 hour at the polymerization temperature. Any volatile cleavage products from the initiator and/or any residual monomers were then removed by distillation by briefly applying a vacuum of approximately 15 mbar at the polymerization temperature. The resulting hot, low-viscosity product was then discharged from the reactor for cooling on sheet aluminum trays. Once the resin melt had solidified, it was mechanically comminuted.

In full-scale production, the discharged, hot product is conveniently cooled on cooling belts followed by a pelletizing unit, or directly from tabletting belts.

The reaction temperatures and composition of parts I to III are set forth in Table 1 together with the properties of the products.

Starting Material

Polyester

A polyesterpolyol having an OH number of 98 mg of KOH/g and an acid number of 1.5 mg of KOH/g and produced by reacting 22.07 parts of 2-ethylhexanoic acid, 30.29 parts of trimethylolpropane (TMP), 12.67 parts of neopentyl glycol, 32.24 parts of hexahydrophthalic anhydride and 12.29 parts of adipic acid.

TABLE 1

Polyester/polacrylate polyol A) prepared by the process according to the invention (quantities stated in g)

| Copolymer | I |
|---|---|
| Part I | |
| Polyester | 350 |
| Dimethyl maleate | 175 |
| Part II | |
| Methyl methacrylate | 700 |
| Styrene | 1256 |
| Hydroxyethyl methacrylate | 568 |
| Butyl methacrylate | 350 |
| Acrylic acid | 31 |
| Part III | |
| Di-tert-butyl peroxide | 70 |
| Polymerization temperature (°C.) | 160 |
| Solids content (%) | 99.8 |
| Acid number (mg KOH/g) | 7.8 |
| OH-number (mg KOH/g | 79.8 |
| Glass transition temperature $T_g$ | 49.6°C. |

2. Production of Crosslinking Component B a) Production of a Polyisocyanate 1332 g of isophorone diisocyanate (IPDI) are initially introduced under nitrogen into a 2-liter four-necked flask equipped with a stirrer, a gas inlet pipe, an internal thermometer, a dropping funnel and a reflux condenser and the mixture is heated to 80° C. 15 ml of a 5% by weight solution of 2-hydroxypropyl-trimethylammonium hydroxide in 2-ethyl-1,3-hexanediol/methanol (6:1, parts by weight) are added dropwise slowly and uniformly from a dropping funnel over a period of 45 minutes. During this process the temperature increases to 88° C. When the dropwise addition is complete the mixture is stirred at 80° C. until the NCO content in the reaction mixture reaches 30.6%. Then the reaction is terminated by adding 0.36 g (70 molar ppm) of a 25% solution of dibutyl phosphate in IPDI. Any excess quantity of monomeric IPDI is removed by thin-layer distillation. An almost colourless transparent resin is obtained in a yield of 44% and dissolved in methyl ethyl ketone in a concentration of 70%. The viscosity of the solution at 23° C. is 300 mPa.s, the NCO content is 11.8% and the content of free monomeric IPDI is 0.18%.

b) Production of a Blocked Polyisocyanate 500 g of the polyisocyanate solution are initially introduced into a 1 liter three-necked flask equipped with a stirrer, an internal thermometer and a reflux condenser and the mixture is heated to 60° C. 134.8 g of 3,5-dimethylpyrazole are added in portions with stirring and then stirred at 60° C. until no isocyanate band is any longer visible in the IR spectrum.

3. Production of an Aqueous Dispersion Which Dries in the Form of a Powder 701.6 g of the polyester polyacrylate polyol (polyol component A) and 453.4 g of the blocked polyisocyanate (crosslinking component B) are dissolved in 1464.4 g of methyl ethyl ketone (MEK) and 7.1 g of the neutralising agent dimethylethanolamine are added. Then the following quantities of additives are added: 6.5 g of Byk 348 (a levelling agent from Byk-Chemie) and 21.0 g of emulsifier WN (an emulsifying auxiliary from Bayer AG).

Two processes are described in the following as examples for the production of the aqueous dispersion:

a) An oil-in-water type pre-emulsion is produced from 2654 g of the solution of binder, neutralising agent and additives in MEK by intense mixing with 1613.2 g of water using a dissolver. Then this pre-emulsion is finely dispersed at an elevated pressure (20 bars) through a jet disperser having a hydraulic diameter of 0.5 mm. The MEK is removed by distillation in vacuo. A polymer dispersion having the following properties is obtained:

draining time (ISO 4 cup, 23° C.): 14 secs solids content: 39.5% particle size (laser correlation spectroscopy): 0.41 μm at K2 value=0.12 b) A water-in-oil emulsion 1 is produced from 2654 g of the solution of binder, neutralising agent and additives in MEK by intense mixing with 484 g of water using a dissolver (cf. FIG. 2). The emulsion 1 is pumped along loop 8 from container 2 via booster pump 3 with a pumping capacity of 410 kg/h, with the simultaneous introduction of 1129.2 g of water 4 from container 5 by means of pump 6 with a pumping capacity of 12 gk/h, through a jet disperser 7 having a hydraulic diameter of 0.5 mm with a pressure drop of 20 bars in the nozzle. After approximately 90% of the quantity of water has been introduced phase reversal takes place in nozzle 7. The remaining quantity of water is added and the oil-in-water emulsion is removed via the nozzle. The MEK is distilled off in vacuo. A polymer dispersion having the following properties is obtained:

draining time (ISO 4 cup, 23° C.): 14 secs solids content: 39.5% particle size (laser correlation spectroscopy): 0.21 μm at K2 value=0.08

4. Application and Properties

The application and film properties of a clear coating composition are set forth.

When the lacquer dispersion was applied onto a surface and dried at room temperature, a pulverulent surface was formed, which was readily removed with water.

When the aqueous dispersion was stoved immediately after application, a high gloss coating with good levelling and good resistance to water and organic solvents was obtained.

The coating composition was applied using a commercial air mix spray gun ontok sheet metal which had been pre-coated with an aqueous cathodic electro-coating, an aqueous surfacer coating and an aqueous black basecoat. These coatings are conventionally used in automotive OEM coatings.

Drying conditions:

1 minute at 23° C., then heating to 140° C. in 3 minutes and final curing at 140° C. for 30 minutes.

Coating properties:

Dry film thickness:

40 μm

Gloss 20°/60°:

80/97

Exposure to water, 24 h at 23° C.:

no change

Solvent resistance*):

Exposure time:

1 minute: 0/0/1/3

5 minutes: 0/1/3/5

Solvent types*):

xylenelmethoxypropyl acetate/ethyl acetate/acetone

Ratings—0=undamaged, 5=severely attacked.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an aqueous dispersion which forms powder coatings at room temperature, has an average particle size of 0.1 to 10 μm, and forms a film and crosslinks under the action of heat, in which the dispersion is prepared by mixing A) a polyol component which has a glass transition temperature $T_g$ of >30° C. and is optionally hydrophilically modified, B) a (cyclo)aliphatic polyisocyanate component which contains isocyanurate groups and blocked isocyanate groups and is optionally hydrophilically modified, C) water, and D) optionally external emulsifiers, and passing the mixture through a dispersion device containing flash homogenizing nozzles.

2. The process of claim 1 which comprises mixing components A), B), C) and optionally D) to form a water-in-oil emulsion and converting this emulsion to an oil-in-water emulsion in a flash homogenizing nozzle.

3. The process of claim 1 wherein said dispersion has an average particle size of 0.1 to 5 μm.

4. The process of claim 3 which comprises mixing components A), B), C) and optionally D) to form a water-in-oil emulsion and converting this emulsion to an oil-in-water emulsion in a flash homogenizing nozzle.

5. The process of claim 1 wherein said dispersion has an average particle size of preferably 0.1 to 3 μm.

6. The process of claim 5 which comprises mixing components A), B), C) and optionally D) to form a water-in-oil emulsion and converting this emulsion to an oil-in-water emulsion in a flash homogenizing nozzle.

7. The process of claim 1 wherein said dispersion has an average particle size of 0.1 to 0.6 μm.

8. The process of claim 7 which comprises mixing components A), B), C) and optionally D) to form a water-in-oil emulsion and converting this emulsion to an oil-in-water emulsion in a flash homogenizing nozzle.

9. An aqueous dispersion which forms powder coatings at room temperature, has an average particle size of 0.1 to 0.6 μm, and forms a film and crosslinks under the action of heat, in which the dispersion is prepared by mixing A) a polyol component which has a glass transition temperature $T_g$ of >30° C. and is optionally hydrophilically modified, B) a (cyclo)aliphatic polyisocyanate component which contains isocyanurate groups and blocked isocyanate groups and is optionally hydrophilically modified, C) water, and D) optionally external emulsifiers, and passing the mixture through a dispersion device containing flash homogenizing nozzles.

10. The aqueous dispersion of claim 9 in which the dispersion is prepared by mixing components A), B), C) and optionally D) to form a water-in-oil emulsion and converting this emulsion to an oil-in-water emulsion in a flash homogenizing nozzle.

* * * * *